United States Patent
Yang

(10) Patent No.: US 12,004,245 B2
(45) Date of Patent: Jun. 4, 2024

(54) METHOD AND APPARATUS FOR ESTABLISHING UNICAST CONNECTION BASED ON SIDELINK

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 592 days.

(21) Appl. No.: 17/230,238

(22) Filed: Apr. 14, 2021

(65) Prior Publication Data

US 2021/0235522 A1    Jul. 29, 2021

Related U.S. Application Data

(63) Continuation of application No. PCT/CN2018/110661, filed on Oct. 17, 2018.

(51) Int. Cl.
*H04W 76/14* (2018.01)
*H04W 8/26* (2009.01)
*H04W 48/04* (2009.01)
*H04W 48/10* (2009.01)
*H04W 64/00* (2009.01)

(52) U.S. Cl.
CPC ............. *H04W 76/14* (2018.02); *H04W 8/26* (2013.01); *H04W 48/04* (2013.01); *H04W 48/10* (2013.01); *H04W 64/003* (2013.01)

(58) Field of Classification Search
CPC ....... H04W 4/06; H04W 48/04; H04W 48/10; H04W 48/12; H04W 64/003; H04W 76/14; H04W 76/18; H04W 8/005; H04W 8/26–28
See application file for complete search history.

(56) References Cited

U.S. PATENT DOCUMENTS

2015/0024745 A1*  1/2015  Zhou ................... H04W 8/005
                                                   455/434
2017/0195877 A1*  7/2017  Lehtovirta ............ H04W 8/005

FOREIGN PATENT DOCUMENTS

EP           3273740 B1 *  1/2021  ............ H04W 48/10

OTHER PUBLICATIONS

Lenovo, Motorola Mobility, "Connection establishment for Unicast in NR V2X", 3GPP TSG-RAN WG2 Meeting #103b, R2-1814503, Chengdu, China, Oct. 8-12, 2018, 4 pages.
International Search Report in International Application No. PCT/CN2018/110661, mailed on Jul. 27, 2019.

* cited by examiner

*Primary Examiner* — Thomas R Cairns
(74) *Attorney, Agent, or Firm* — Finnegan, Henderson, Farabow, Garrett & Dunner, L.L.P.

(57) ABSTRACT

A method for establishing a unicast connection based on sidelink, performed by a first terminal, includes: broadcasting an access control parameter, wherein the access control parameter is configured to determine whether a second terminal is a target terminal allowed to establish the unicast connection with the first terminal; receiving a connection establishment request message transmitted by the second terminal in response to the second terminal being the target terminal; and establishing the unicast connection with the second terminal based on the connection establishment request message.

14 Claims, 14 Drawing Sheets

METHOD AND APPARATUS FOR ESTABLISHING UNICAST CONNECTION BASED ON SIDELINK

CROSS-REFERENCE TO RELATED APPLICATION

This application is a continuation application of International Application No. PCT/CN2018/110661, filed on Oct. 17, 2018, the entire content of which is incorporated herein by reference.

TECHNICAL FIELD

The present disclosure relates to a field of communication technology, and particularly to a method and an apparatus for establishing a unicast connection based on sidelink.

BACKGROUND

In the related art, in order to support direct communication among terminals, sidelink communication is introduced. The protocol stack of the sidelink communication includes the protocol of each layer in the network. As illustrated in FIG. 1, the interface among the terminals is PC-5.

In 5G, namely NR (New Radio) system, in order to support enhanced V2X (Vehicle to everything) service, unicast connections need to be established based on sidelink communication.

The transmission method for sidelink addresses through MAC (Media Access Control) layer's source address identification and destination address identification, and there is no need to establish a connection before transmission, in which, the structure of the MAC child header is illustrated in FIG. 2.

Taking the limited capabilities of the terminal into consideration, a preset number of unicast connections may be supported at the same time, so the process of establishing a unicast connection needs to be controlled.

SUMMARY

In a first aspect of embodiments of the present disclosure, there is provided a method for establishing a unicast connection based on sidelink. The method is performed by a first terminal, and includes: broadcasting an access control parameter, wherein the access control parameter is configured to determine whether a second terminal is a target terminal allowed to establish the unicast connection with the first terminal; receiving a connection establishment request message transmitted by the second terminal in response to the second terminal being the target terminal; and establishing the unicast connection with the second terminal based on the connection establishment request message.

In a second aspect of embodiments of the present disclosure, there is provided a method for establishing a unicast connection based on sidelink. The method is performed by a second terminal, and includes: receiving an access control parameter broadcasted by a first terminal; determining, according to the access control parameter, whether the second terminal is a target terminal allowed to establish the unicast connection with the first terminal, and transmitting a connection establishment request message to the first terminal in response to the second terminal being the target terminal, to allow the first terminal to establish the unicast connection with the second terminal based on the connection establishment request message.

In a third aspect of embodiments of the present disclosure, there is provided a non-transitory computer-readable storage medium having stored thereon instructions that, when executed by a processor of a device, cause the device to perform the method for establishing a unicast connection based on sidelink in the first aspect.

In a fourth aspect of embodiments of the present disclosure, there is provided a non-transitory computer-readable storage medium having stored thereon instructions that, when executed by a processor of a device, cause the device to perform the method for establishing a unicast connection based on sidelink in the second aspect.

In a fifth aspect of embodiments of the present disclosure, there is provided a first terminal, including: a processor: and a memory configured to store instructions executable by the processor; wherein the processor is configured to: broadcast an access control parameter, wherein the access control parameter is configured to determine whether a second terminal is a target terminal allowed to establish the unicast connection with the first terminal: receive a connection establishment request message transmitted by the second terminal in response to the second terminal being the target terminal: and establish the unicast connection with the second terminal based on the connection establishment request message.

In a sixth aspect of embodiments of the present disclosure, there is provided a second terminal, including: a processor: and a memory configured to store instructions executable by the processor; wherein the processor is configured to: receive an access control parameter broadcasted by a first terminal; determine, according to the access control parameter, whether the second terminal is a target terminal allowed to establish a unicast connection with the first terminal; and transmit a connection establishment request message to the first terminal in response to the second terminal being the target terminal, to allow the first terminal to establish the unicast connection with the second terminal based on the connection establishment request message.

It should be noted that the above description and following description are exemplary and illustrative, and do not constitute the limitation on the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used in the present disclosure are only for the purpose of describing exemplary embodiments, and are not restrictive of the present disclosure. For example, the terms first, second, third, etc. may be adopted in the present disclosure to describe various information, and the information is not limited to these terms. These terms are only used to distinguish the same type of information from each other. For example, without departing from the scope of the present disclosure, first information may also be referred to as second information, and similarly, second information may also be referred to as first information. Depending on the context, the word "if" as used herein can be interpreted as "when" or "in response to determine".

Embodiments of the present disclosure provide methods for establishing a unicast connection based on sidelink.

Figure 1:
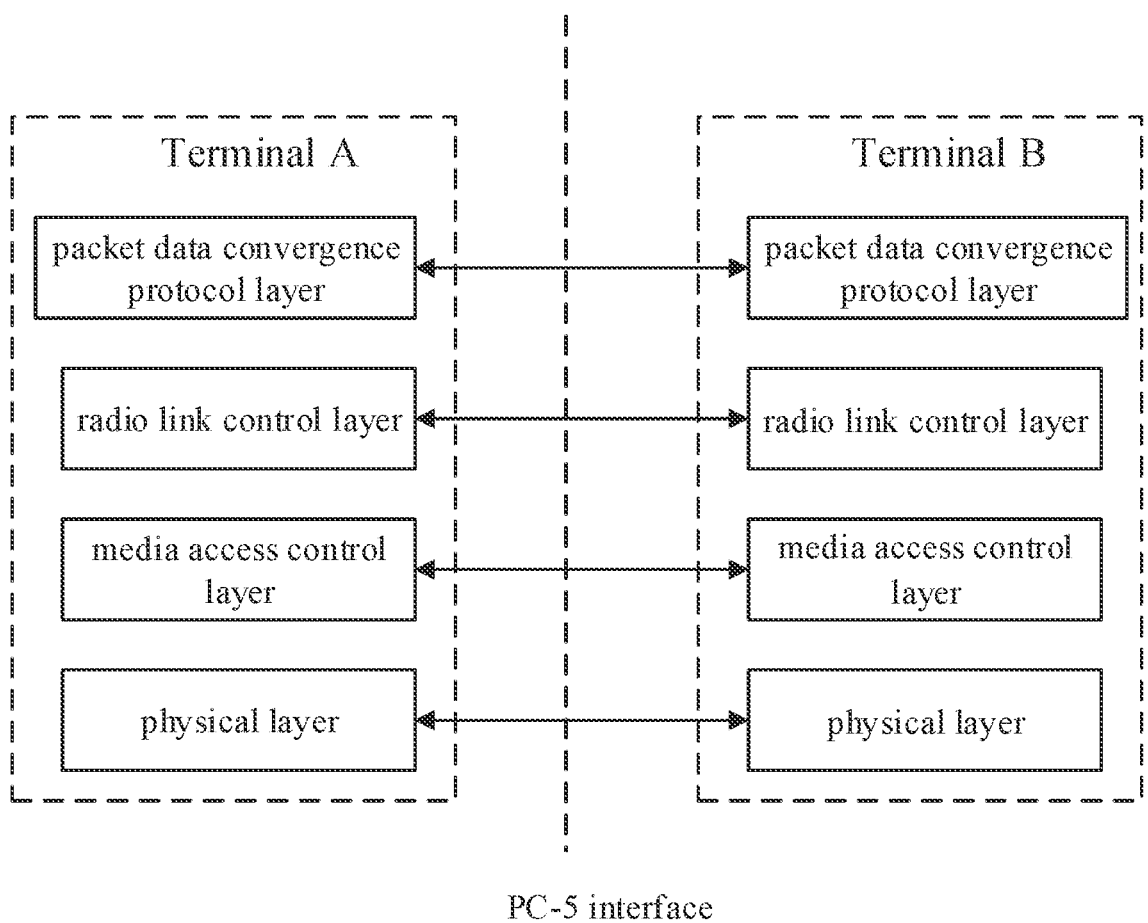
FIG. 1 is a schematic diagram of protocol stack based on sidelink in the related art.
Figure 2:
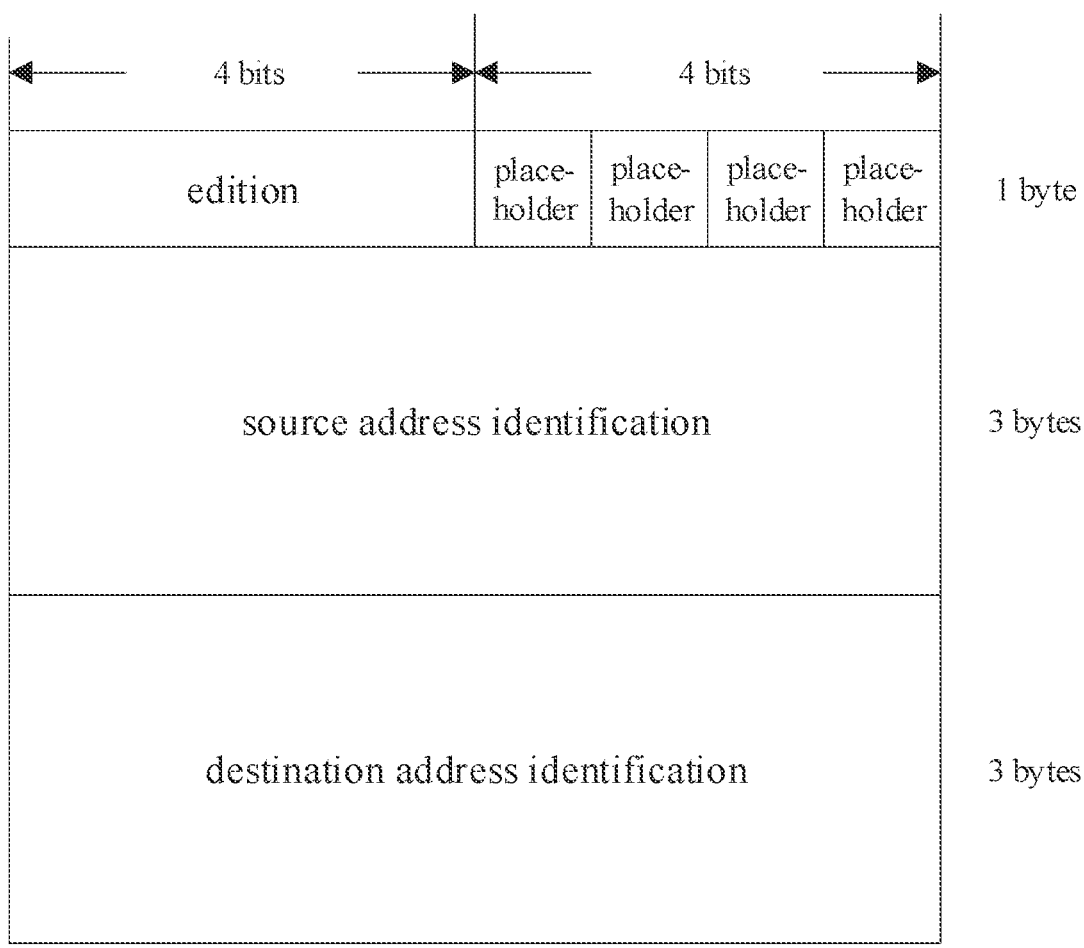
FIG. 2 is a schematic diagram of a MAC child header in the related art.
Figure 3:
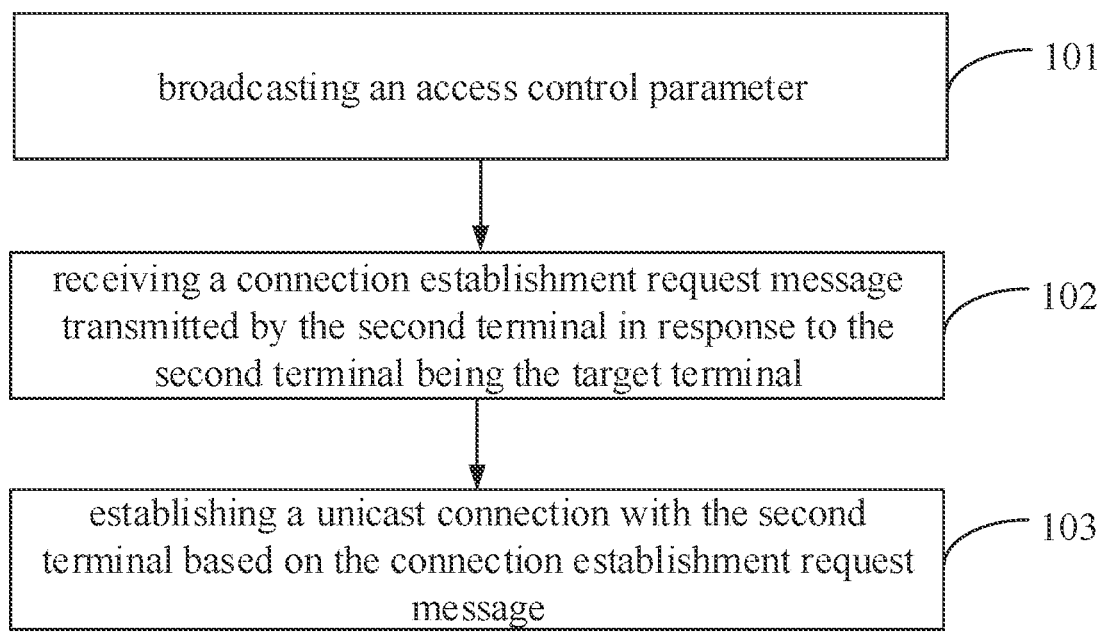
FIG. 3 is a flow chart illustrating a method for establishing a unicast connection based on sidelink according to an exemplary embodiment.

FIG. 3 is a flow chart illustrating a method for establishing a unicast connection based on sidelink according to an exemplary embodiment. For example, the method may be performed by a first terminal and include the following operations.

At block 101, an access control parameter is broadcasted, wherein the access control parameter is configured for a second terminal to determine whether the second terminal is a target terminal allowed to establish the unicast connection with the first terminal.

At block 102, a connection establishment request message transmitted by the second terminal is received in response to the second terminal being the target terminal.

At block 103, the unicast connection with the second terminal is established based on the connection establishment request message.

In the embodiment, the first terminal may provide access to the access control parameter by broadcasting, so that the second terminal may determine whether the second terminal itself is allowed to transmit the connection establishment request message to the first terminal based on the access control parameter, thereby realizing the control of establishing a unicast connection between terminals based on a communication process of sidelink.

Figure 4A:
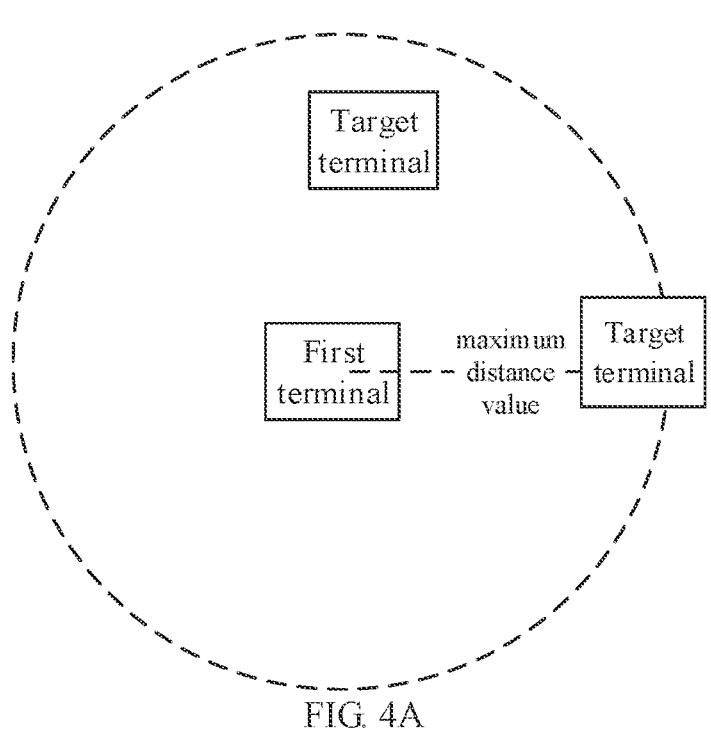
FIG. 4A and FIG. 4B are schematic diagrams illustrating scenarios for establishing a unicast connection based on sidelink according to an exemplary embodiment.

In an embodiment, the access control parameter broadcasted by the first terminal includes a maximum distance value between target terminals and the first terminal. Terminals within the range covered by the circle with the first terminal as the center and the maximum distance value as the radius belong to the target terminals, as illustrated in FIG. 4A.

Figure 4B:
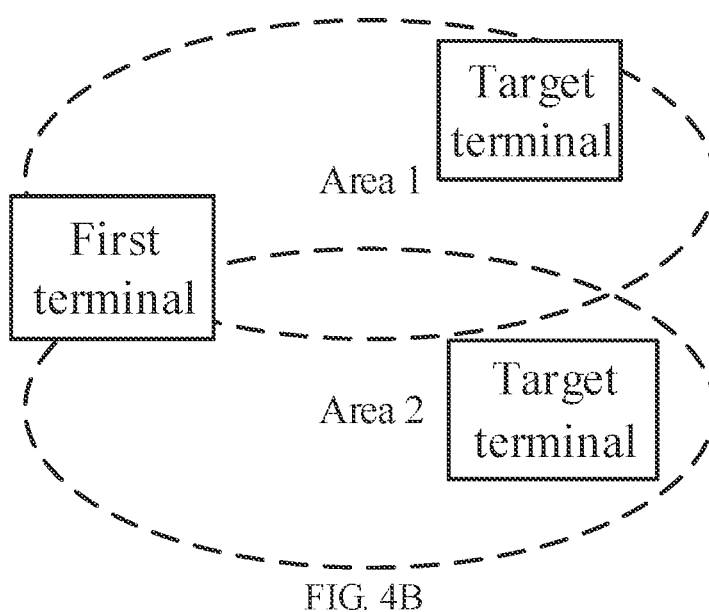

In an embodiment, the access control parameter broadcasted by the first terminal includes a target area identification of the target area where target terminals are located. Terminals located in the target area indicated by the target area identification are the target terminals. As illustrated in FIG. 4B, target area identifications include area 1 and area 2, and terminals in area 1 and area 2 are the target terminals.

In an embodiment, the access control parameter includes a target access probability parameter corresponding to at least one of a target identification parameter and the target area identification. If an access probability parameter randomly generated by a terminal, e.g., according to related art, is less than the target access probability parameter, the terminal is a target terminal.

Exemplary target access probability parameters corresponding to target identification parameters are illustrated in Table 1.

TABLE 1

| Target identification parameter | Target access probability parameter |
| --- | --- |
| Target service type identification parameter 1 | 50% |
| Target terminal type identification parameter 1 | 60% |
| Target service type identification parameter 2 and Target terminal type identification parameter 2 | 70% |
| . . . | . . . |

The target service type identification parameter may identify a service type of the target terminal, such as data service, signaling service, or emergency call service. The target terminal type identification parameter may identify a terminal type of the target terminal, such as operator reserved user, high-priority user, or ordinary user.

Exemplary target access probability parameters corresponding to target area identifications are illustrated in Table 2.

TABLE 2

| Target area identification | Target access probability parameter |
|---|---|
| Area 1 | 90% |
| Area 1 and Area 2 | 50% |
| ... | ... |

In an embodiment, the target access probability parameter correspond to both the target identification parameter and the target area identification, as illustrated in Table 3.

TABLE 3

| Target identification parameter | Target area identification | Target access probability parameter |
|---|---|---|
| Target service type identification parameter 1 | Area 1 | 70% |
| Target terminal type identification parameter 1 | Area 1 and Area 2 | 50% |
| Target service type identification parameter 2 and Target terminal type identification parameter 2 | Area 2 and Area 3 | 50% |
| ... | | ... |

In embodiments of the present disclosure, the target access probability parameter may correspond to at least one of the target identification parameter and the target area identification, and may also correspond to a distance value or a distance range value between a target terminal and the first terminal, as illustrated in Table 4, which is not limited in the present disclosure.

TABLE 4

| Distance range value (Unit: m) | Target access probability parameter |
|---|---|
| 10-20 | 90% |
| 20-40 | 70% |
| ... | ... |

In some embodiments, the first terminal may broadcast the access control parameter according to the related art.

In an embodiment, the second terminal may transmit the connection establishment request message to the first terminal after it is determined that the second terminal itself is a target terminal, and the first terminal may directly receive the message.

In an embodiment, the first terminal may establish the unicast connection with the second terminal based on the connection establishment request message transmitted by the second terminal, e.g., according to the related art.

In the above embodiments, the first terminal may broadcast the access control parameter, so that the second terminal may determine whether the second terminal itself is allowed to transmit the connection establishment request message to the first terminal based on the access control parameter, thereby realizing the control of establishing the unicast connection among terminals in the communication process based on sidelink.

Figure 5:
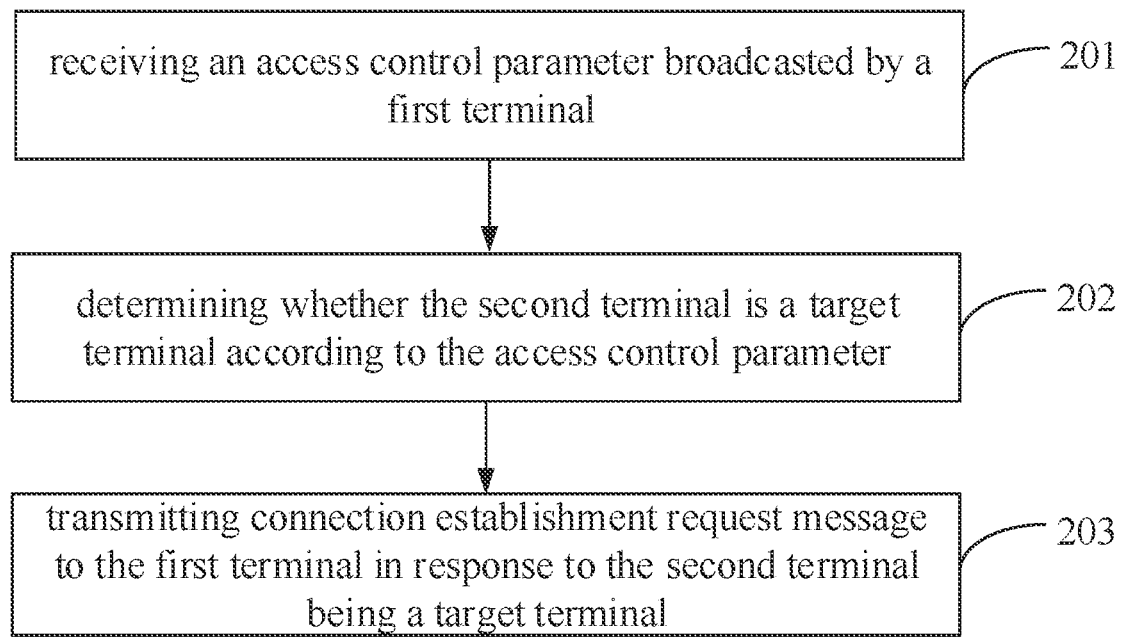
FIG. 5 is a flow chart illustrating a method for establishing a unicast connection based on sidelink according to an exemplary embodiment.

FIG. 5 is a flow chart illustrating a method for establishing a unicast connection based on sidelink, according to an exemplary embodiment. For example, the method may be performed by a second terminal and include the following operations.

At block 201, an access control parameter broadcasted by a first terminal is received.

At block 202, it is determined whether the second terminal is a target terminal according to the access control parameter, wherein the target terminal is allowed to establish the unicast connection with the first terminal.

At block 203, a connection establishment request message is transmitted to the first terminal in response to the second terminal being the target terminal, and the first terminal establishes the unicast connection with the second terminal based on the connection establishment request message.

In the embodiment, the second terminal may determine whether the second terminal itself is a target terminal that is allowed to establish a unicast connection with the first terminal according to the access control parameter broadcasted by the first terminal, and send the connection establishment request message to the first terminal when it is determined that the second terminal itself is a target terminal, thereby establishing a unicast connection with the first terminal. In the communication process based on sidelink, the control of establishing a unicast connection between terminals is realized.

In an embodiment, the second terminal may receive the access control parameter broadcasted by the first terminal, e.g., according to the related art.

In an embodiment, the second terminal may determine whether the second terminal itself is a target terminal according to various access control parameters.

Figure 6:
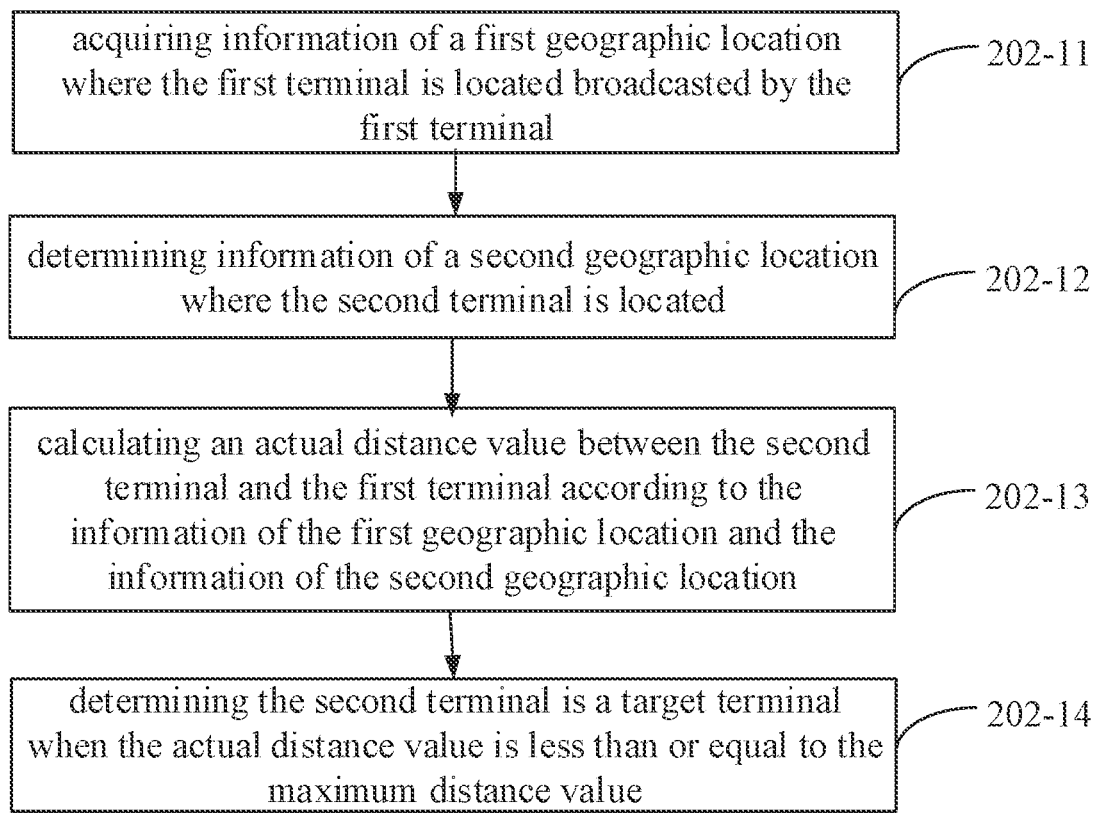
FIG. 6 is a flow chart illustrating a method for establishing a unicast connection based on sidelink according to an exemplary embodiment.

In an embodiment, the access control parameter includes a maximum distance value between target terminals and the first terminal. Accordingly, as illustrated in FIG. 6, block 202 (FIG. 5) in the method for establishing a unicast connection based on sidelink may include the following operations.

At block 202-11, information of a first geographic location where the first terminal is located broadcasted by the first terminal is acquired.

For example, the first terminal may broadcast the information of the first geographic location where the first terminal is located periodically according to a preset period. The first geographic location information may include a latitude value and a longitude value of the first terminal. The second terminal may directly receive the information of the first geographic location.

At block 202-12, the information of a second geographic location where the second terminal is located is determined.

For example, the second terminal may similarly determine the information of the second geographic location where the second terminal itself is located, for example, a latitude value and a longitude value of the second terminal.

At block 202-13, an actual distance value between the second terminal and the first terminal is calculated according to the information of the first geographic location and the information of the second geographic location.

For example, the second terminal may calculate the actual distance value between the second terminal and the first terminal according to the latitude value and the longitude value corresponding to the first terminal, and the latitude value and the longitude value of the second terminal.

At block 202-14, it is determined that the second terminal is a target terminal when the actual distance value is less than or equal to the maximum distance value.

In the embodiments, when the actual distance value is less than or equal to the maximum distance value, the second terminal is in the range covered by the circle with the first terminal as the center and the maximum distance value as the radius. Thus, the second terminal is a target terminal.

When the actual distance value is larger than the maximum distance value, it is determined that the second terminal is not a target terminal.

Figure 7:
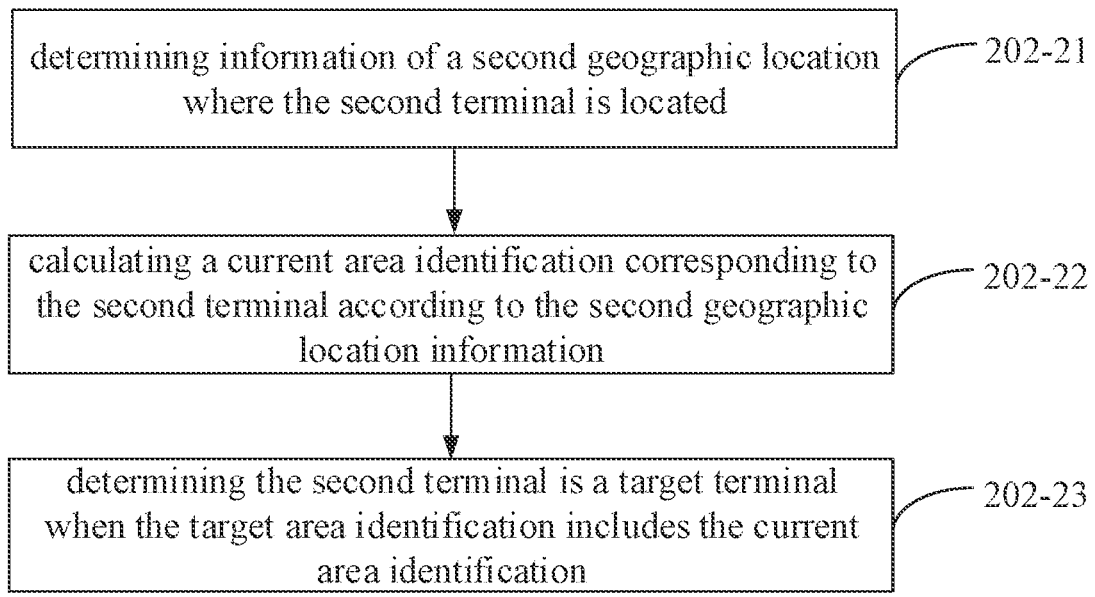
FIG. 7 is a flow chart illustrating a method for establishing a unicast connection based on sidelink according to an exemplary embodiment.

In an embodiment, the access control parameter includes a target area identification of the target area where target terminals are located. Accordingly, as illustrated in FIG. 7, block 202 (FIG. 5) in the method for establishing a unicast connection based on sidelink may include the following operations.

At block 202-21, the information of a second geographic location w % here the second terminal is located is determined.

For example, the second terminal may determine the information of the second geographic location where the second terminal itself is located, for example, the latitude value and the longitude value of the second terminal.

At block 202-22, a current area identification corresponding to the second terminal is calculated according to the second geographic location information.

For example, the second terminal may adopt the following formulas to calculate the current area identification corresponding to the second terminal itself:

$$x_1 = \text{Floor}(x/L) \bmod N_x$$

$$y_1 = \text{Floor}(y/W) \bmod N_y$$

$$\text{zone\_id} = y_1 \times N_x + x_1$$

where the Floor function is a round-down function, x is the longitude value of the second terminal, L is the area length value of the current area, $N_x$ is the area number on the unit length value, y is the latitude value of the second terminal, and W is the area width value of the current area. $N_y$ is the area number on the unit width value, and zone_id is the current area identification.

At block 202-23, it is determined that the second terminal is a target terminal when the target area identification includes the current area identification.

For example, when the access control parameter broadcasted by the first terminal includes a target area identification, and the target area identification includes the current area identification, it is determined that the second terminal is a target terminal, otherwise it is determined that the second terminal is not a target terminal.

Figure 8:
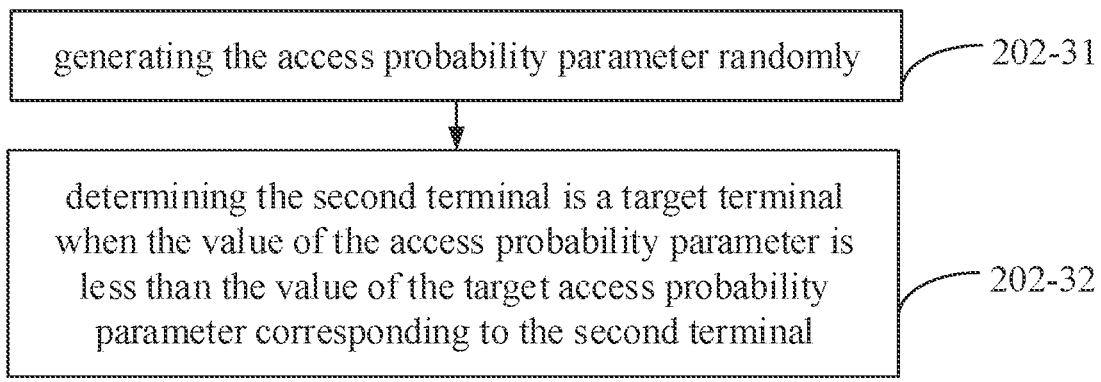
FIG. 8 is a flow chart illustrating a method for establishing a unicast connection based on sidelink according to an exemplary embodiment.

In an embodiment, the access control parameter includes a target access probability parameter corresponding to at least one of a target identification parameter and a target area identification. Accordingly, as illustrated in FIG. 8, block 202 (FIG. 5) in the method for establishing a unicast connection based on sidelink may include the following operations.

At block 202-31, an access probability parameter is generated randomly, wherein the access probability parameter is configured to identify a success rate of accessing the first terminal by the second terminal.

For example, the second terminal may automatically and randomly generate a parameter of the success rate of accessing the first terminal.

In block 202-32, it is determined that the second terminal is a target terminal when the value of the access probability parameter is less than the value of the target access probability parameter corresponding to the second terminal.

For example, the second terminal may determine the target access probability parameter corresponding to the second terminal according to at least one of its own service type, its own terminal type, and Table 1.

When the value of the access probability parameter is less than the value of the target access probability parameter corresponding to the second terminal, it is determined that the second terminal is a target terminal; otherwise, it is determined that the second terminal is not a target terminal.

As described above, at block 203 (FIG. 5), a connection establishment request message is transmitted to the first terminal when it is determined that the second terminal itself is a target terminal that is allowed to establish a unicast connection with the first terminal. The first terminal then establishes a unicast connection with the second terminal based on the connection establishment request message.

In the embodiments, the second terminal may determine whether the second terminal itself is a target terminal that is allowed to establish a unicast connection with the first terminal according to the access control parameter broadcasted by the first terminal, and send a connection establishment request message to the first terminal when it is determined that the second terminal itself is a target terminal, thereby establishing a unicast connection with the first terminal. In the communication process based on sidelink, the control of establishing a unicast connection between terminals is realized.

Figure 9:
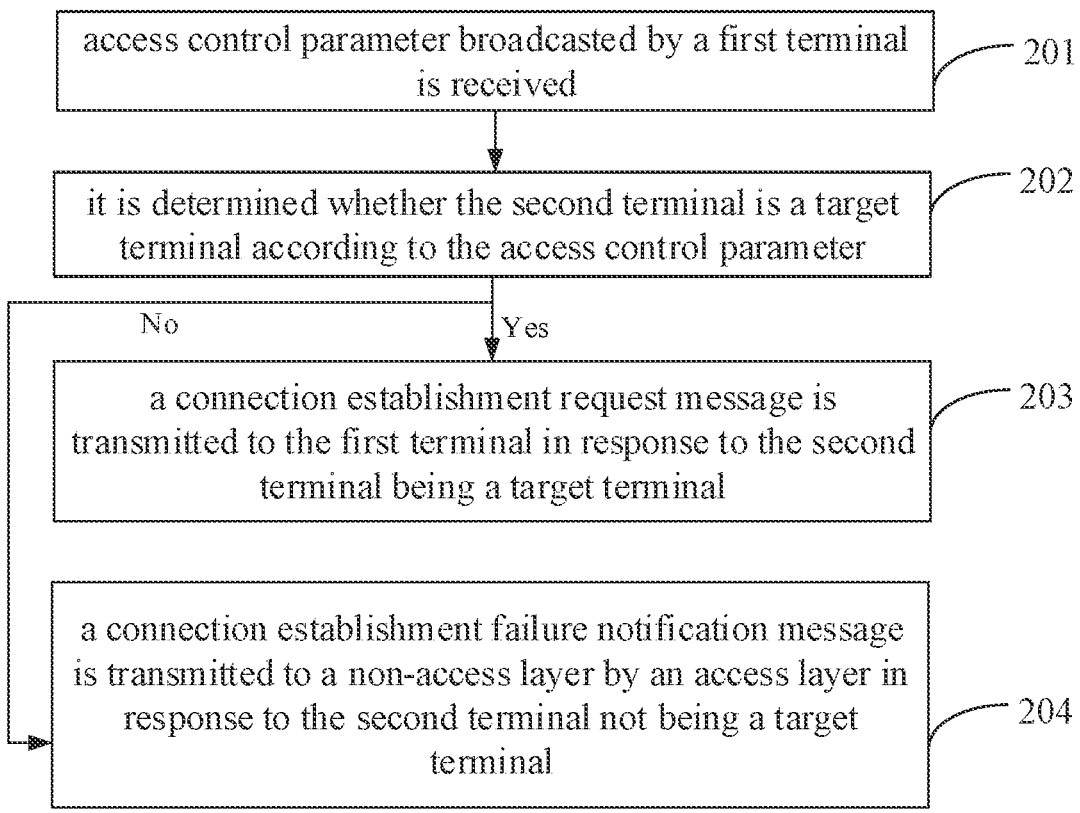
FIG. 9 is a flow chart illustrating a method for establishing a unicast connection based on sidelink according to an exemplary embodiment.

FIG. 9 is a flow chart illustrating a method for establishing a unicast connection based on sidelink according to an exemplary embodiment. In addition to the operations illustrated in FIG. 5, the method further includes the following operation.

At block 204, a connection establishment failure notification message may be transmitted to a non-access layer by an access laver when it is determined that the second terminal itself is not a target terminal.

In the embodiments, when the actual distance value between the second terminal and the first terminal is greater than the maximum distance value, or the target area identification does not include the current area identification corresponding to the second terminal, or the value of the access probability parameters randomly generated by the second terminal is equal to or greater than the value of the target access probability parameter, it is determined that the second terminal is not a target terminal. Then, the connection establishment failure notification message may be transmitted to a non-access layer by an access layer of the second terminal.

In an embodiment, the connection establishment failure notification message may be configured to indicate that the reason for the failure to establish a connection with the first terminal is an access control failure, so that the user of the second terminal can quickly determine the reason that the second terminal has not established a unicast connection with the first terminal.

In embodiments of the present disclosure, when it is determined that the second terminal itself is not a target terminal that is allowed to establish a unicast connection with the first terminal, an access layer may transmit connection establishment failure notification message to a non-access layer. From the above process, the user of the second terminal can be quickly notified that a unicast connection with the first terminal may not be established currently.

Figure 10:
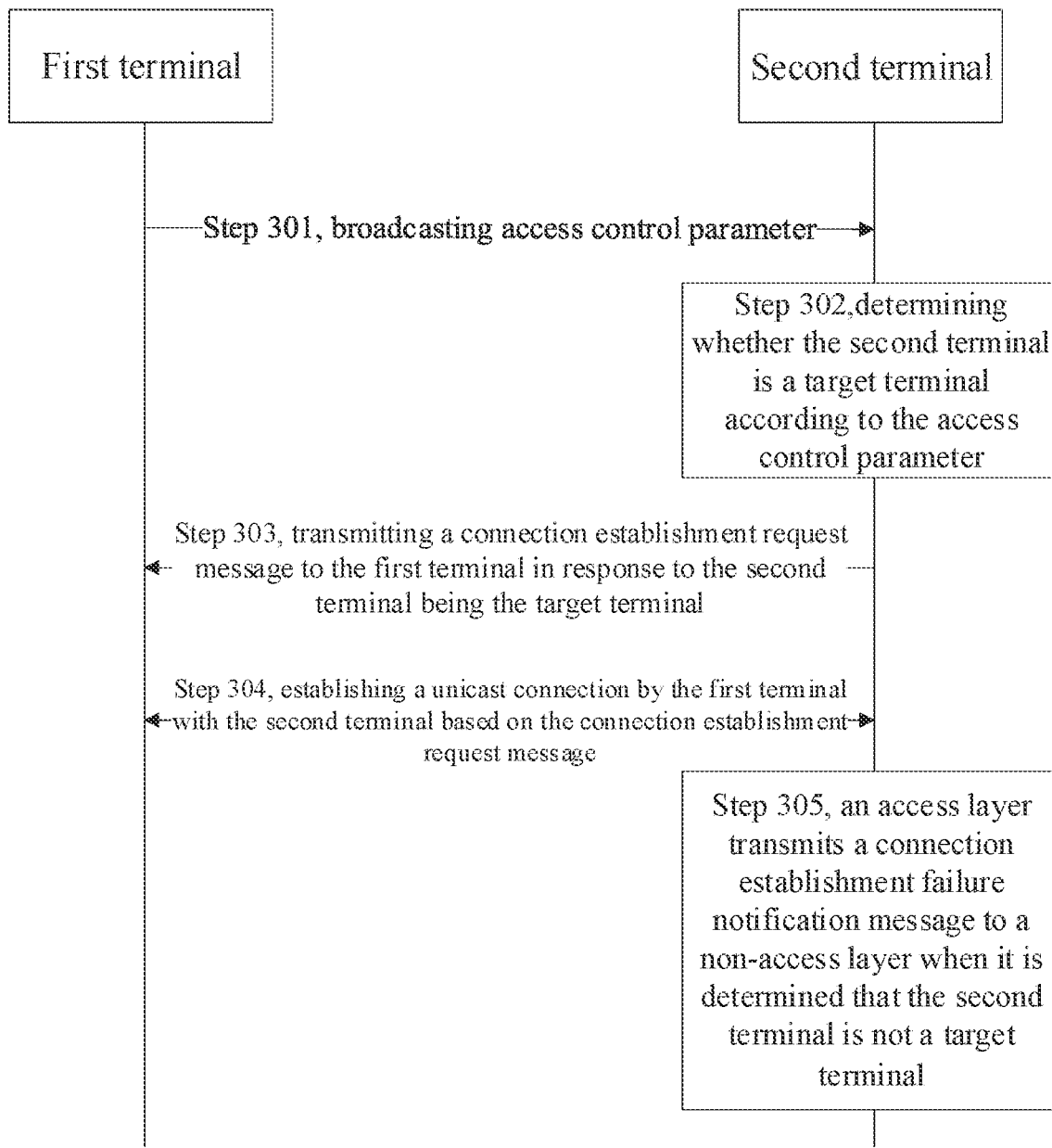
FIG. 10 is a flow chart illustrating a method for establishing a unicast connection based on sidelink according to an exemplary embodiment.

FIG. 10 is a flow chart illustrating a method for establishing a unicast connection based on sidelink according to an exemplary embodiment. The method may include the following operations.

At block 301, a first terminal broadcasts an access control parameter.

The access control parameter may include at least one of; a maximum distance value between target terminals and the first terminal: a target area identification of the target area where the target terminal is located, and a target access probability parameter corresponding to at least one of a target identification parameter and the target area identification.

In an embodiment, the target identification parameter includes at least one of a target service type identification parameter configured to identify the current service type of the target terminal and a target terminal type identification parameter configured to identify the target terminal type, and the target access probability parameter is configured to identify the success rate of successfully establishing a unicast connection between the target terminal and the first terminal.

At block 302, a second terminal may determine whether the second terminal is a target terminal according to the access control parameter. The target terminal is a terminal allowed to establish a unicast connection with the first terminal.

At block 303, a connection establishment request message is transmitted by the second terminal when it is determined that the second terminal itself is the target terminals.

At block 304, the first terminal establishes a unicast connection with the second terminal based on the connection establishment request message.

At block 305, a connection establishment failure notification message may be transmitted to a non-access layer by an access layer when it is determined that the second terminal is not a target terminal.

In an embodiment, terminal A broadcasts the access control parameter, wherein the access control parameter includes a maximum distance value, e.g., 50 meters. When terminal B needs to establish a unicast connection with terminal A, terminal B first calculates that the actual distance between terminal B itself and terminal A is 40 meters according to information of the first geographic location of terminal A and the information of the second geographic location of terminal B. Since 40 meters <50 meters, terminal B determines that it is a target terminal and may transmit a connection establishment request message to terminal A. Terminal A establishes a unicast connection with terminal B based on the connection establishment request message.

In an embodiment, terminal A broadcasts the access control parameter, wherein the access control parameter includes a target area identification including, e.g., area identification 1 and area identification 2. When terminal B needs to establish a unicast connection with terminal A, according to the information of the second geographic location of the terminal B, the current area identification corresponding to itself is calculated as area identification 3. Since the target area identification does not include the current area identification, terminal B determines that terminal B is not a target terminal and cannot transmit a connection establishment request message to terminal A. Then, the access layer of terminal B may notify the non-access layer that it cannot establish a unicast connection with terminal A due to the failure of access control.

In an embodiment, terminal A broadcasts the access control parameter, wherein the access control parameter includes a target access probability parameter corresponding to at least one of a target identification parameter and a target area identification. When the target service type identification parameter is a signaling service, the target access probability parameter is 90%, and when the target service type identification parameter is a data service, the target access probability parameter is 50%. When terminal B needs to establish a unicast connection with terminal A, it is determined that the current service type is a data service, and the corresponding target access probability parameter is 50%. In addition, according to its own second geographic location information, terminal B calculates the current area identification corresponding to itself as area identification 3. Since the target area identification does not include the current area identification, terminal B determines that it is not a target terminal and cannot transmit a connection establishment request message to terminal A. Then, the access layer of terminal B may notify the non-access layer that it cannot establish a unicast connection with terminal A due to the failure of access control.

In an embodiment, terminal A broadcasts the access control parameter, wherein the access control parameter includes a target access probability parameter corresponding to a target identification parameter and a target area identification. When the target service type identification is a signaling service and the target area identification is area 1, the target access probability parameter is 90%; and when the target service type identification is a data service and the target area identifications are area 1 and area 2, the target access probability parameter is 50%. When terminal B needs to establish a unicast connection with terminal A, it is determined that the current service type is a signaling service. Terminal B may calculate that the current area identification corresponding to itself is area 1 according to its own second geographic location information, and the access probability parameter generated randomly by terminal B is 0.7. Since 0.7<0.9, it is determined that terminal B is a target terminal and may transmit a connection establishment request message to terminal A. Terminal A establishes a unicast connection with terminal B based on the connection establishment request message.

In the embodiments, the first terminal broadcasts the access control parameter, and the second terminal may determine whether the second terminal is a target terminal that is allowed to establish a unicast connection with the first terminal according to access control parameter broadcasted by the first terminal, and send a connection establishment request message to the first terminal when it is determined that the second terminal itself is a target terminal, thereby establishing a unicast connection with the first terminal. In the communication process based on sidelink, the control of establishing a unicast connection between terminals is realized.

Corresponding to the foregoing method embodiments, the present disclosure also provides corresponding apparatus embodiments.

Figure 11:
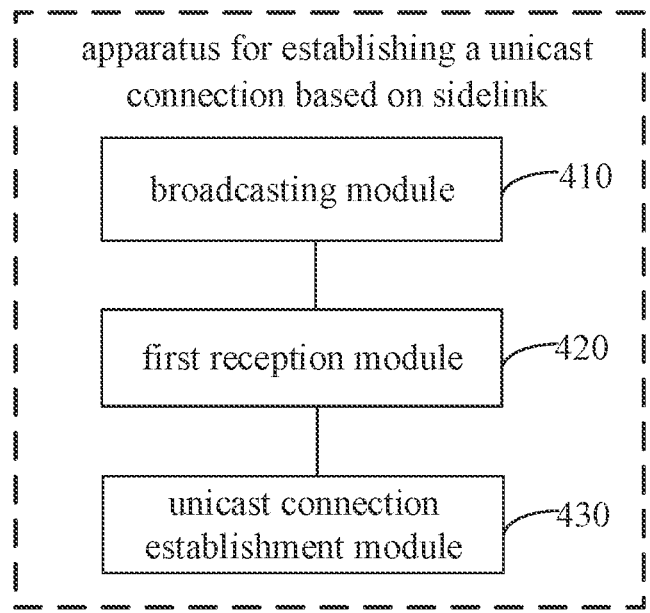
FIG. 11 is a block diagram illustrating an apparatus for establishing a unicast connection based on sidelink according to an exemplary embodiment.

FIG. 11 is a block diagram illustrating an apparatus for establishing a unicast connection based on sidelink according to an exemplary embodiment. For example, the apparatus is applicable to a first terminal. The apparatus includes: a broadcasting module 410, a first reception module 420 and a unicast connection establishment module 430.

The broadcasting module 410 is configured to broadcast an access control parameter, wherein the access control parameter is configured to determine whether a second terminal is a target terminal allowed to establish the unicast connection with the first terminal.

The first reception module 420 is configured to receive a connection establishment request message transmitted by the second terminal in response to the second terminal being the target terminal.

The unicast connection establishment module 430 is configured to establish the unicast connection with the second terminal based on the connection establishment request message.

In an embodiment, the access control parameter includes at least one of: a maximum distance value between the target terminal and the first terminal; a target area identification of a target area where the target terminal is located; and a target access probability parameter corresponding to at least one of a target identification parameter and the target area identification. The target identification parameter includes at least one of a target service type identification parameter configured to identify the current service type of the target terminal and a target terminal type identification parameter configured to identify a target terminal type, and the target access probability parameter is configured to identify a success rate of successfully establishing the unicast connection between the target terminal and the first terminal.

Figure 12:
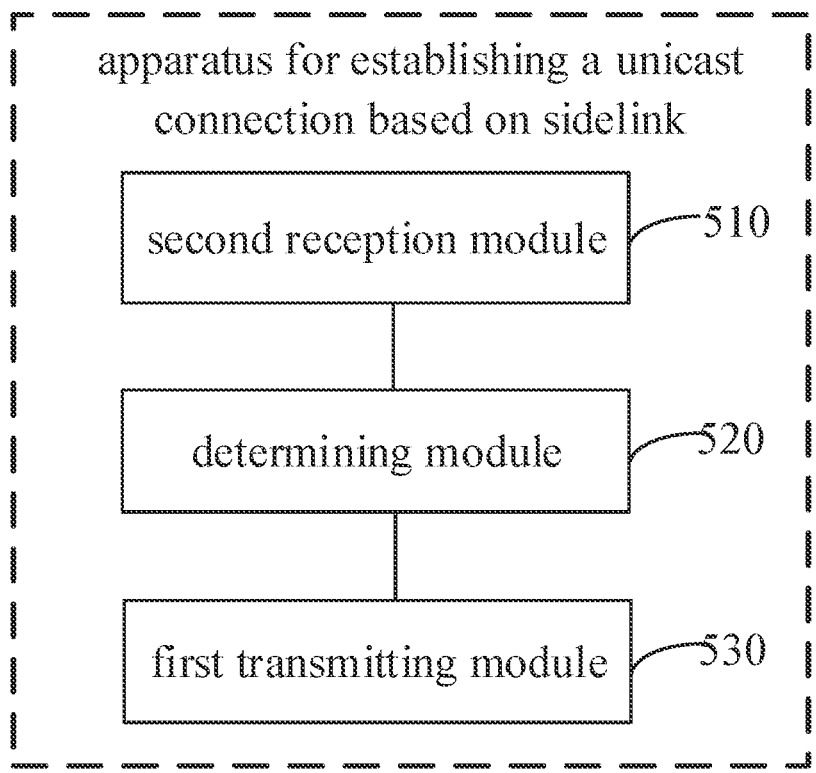
FIG. 12 is a block diagram illustrating an apparatus for establishing a unicast connection based on sidelink according to an exemplary embodiment.

FIG. 12 is a block diagram illustrating an apparatus for establishing a unicast connection based on sidelink according to an exemplary embodiment. For example, the apparatus is applicable to a second terminal and includes: a second reception module 510, a determining module 520 and a first transmitting module 530.

The second reception module 510 is configured to receive an access control parameter broadcasted by a first terminal.

The determining module 520 is configured to determine whether the second terminal is a target terminal according to the access control parameter, wherein the target terminal is allowed to establish the unicast connection with the first terminal.

The first transmitting module 530 is configured to transmit a connection establishment request message to the first terminal in response to the second terminal being the target terminal, to allow the first terminal establishes the unicast connection with the second terminal based on the connection establishment request message.

In an embodiment, the access control parameter includes at least one of: a maximum distance value between the target terminal and the first terminal; a target area identification of a target area where the target terminal is located: and a target access probability parameter corresponding to at least one of a target identification parameter and the target area identification. The target identification parameter includes at least one of a target service type identification parameter configured to identify the current service type of the target terminal and a target terminal type identification parameter configured to identify a target terminal type, and the target access probability parameter is configured to identify a success rate of successfully establishing the unicast connection between the target terminal and the first terminal.

Figure 13:
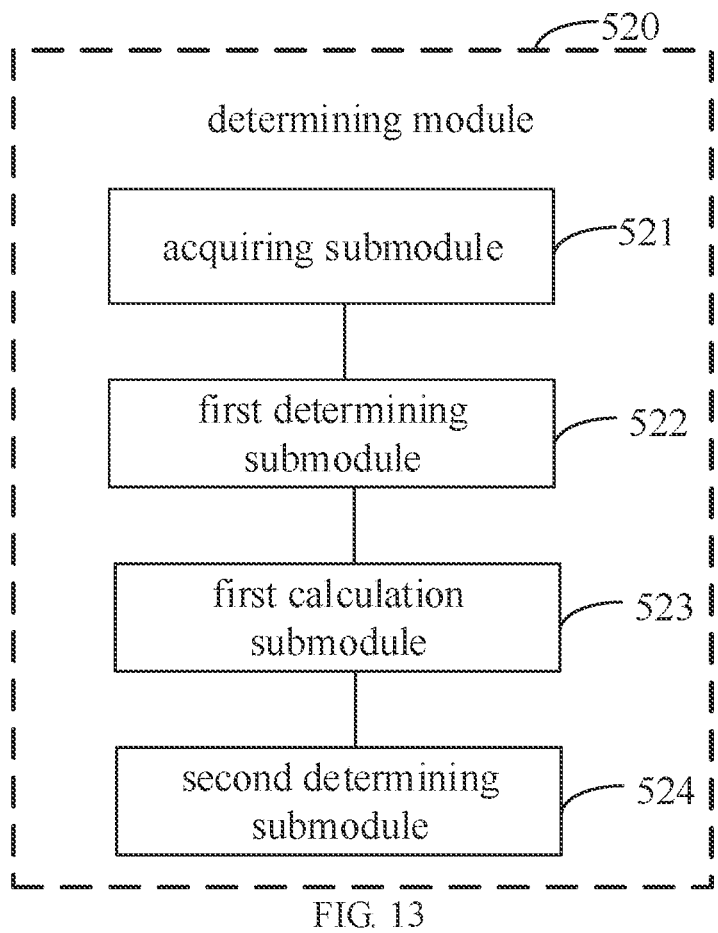
FIG. 13 is a block diagram illustrating an apparatus for establishing a unicast connection based on sidelink according to an exemplary embodiment.

FIG. 13 is a block diagram illustrating an apparatus for establishing a unicast connection based on sidelink according to an exemplary embodiment. The determining module 520 (FIG. 12) includes: an acquiring submodule 521, a first determining submodule 522, a first calculation submodule 523, and a second determining submodule 524.

The acquiring submodule 521 is configured to acquire information of a first geographic location where the first terminal is located broadcasted by the first terminal.

The first determining submodule 522 is configured to determine information of a second geographic location where the second terminal is located.

The first calculation submodule 523 is configured to calculate an actual distance value between the second terminal and the first terminal according to the information of the first geographic location and the information of the second geographic location.

The second determining submodule 524 is configured to determine the second terminal being the target terminal when the actual distance value is less than or equal to the maximum distance value.

Figure 14:
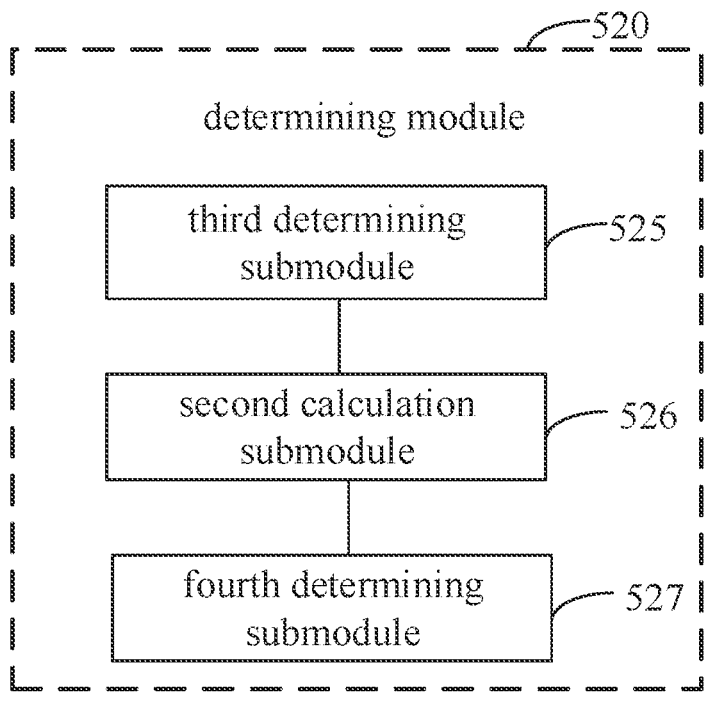
FIG. 14 is a block diagram illustrating an apparatus for establishing a unicast connection based on sidelink according to an exemplary embodiment.

FIG. 14 is a block diagram illustrating an apparatus for establishing a unicast connection based on sidelink according to an exemplary embodiment. The determining module 520 (FIG. 12) includes: a third determining submodule 525, a second calculation submodule 526 and a fourth determining submodule 527.

The third determining submodule 525 is configured to determine information of a second geographic location where the second terminal is located.

The second calculation submodule 526 is configured to calculate a current area identification corresponding to the second terminal according to the second geographic location information.

The fourth determining submodule 527 is configured to determine the second terminal being the target terminal when the target area identification includes the current area identification.

Figure 15:
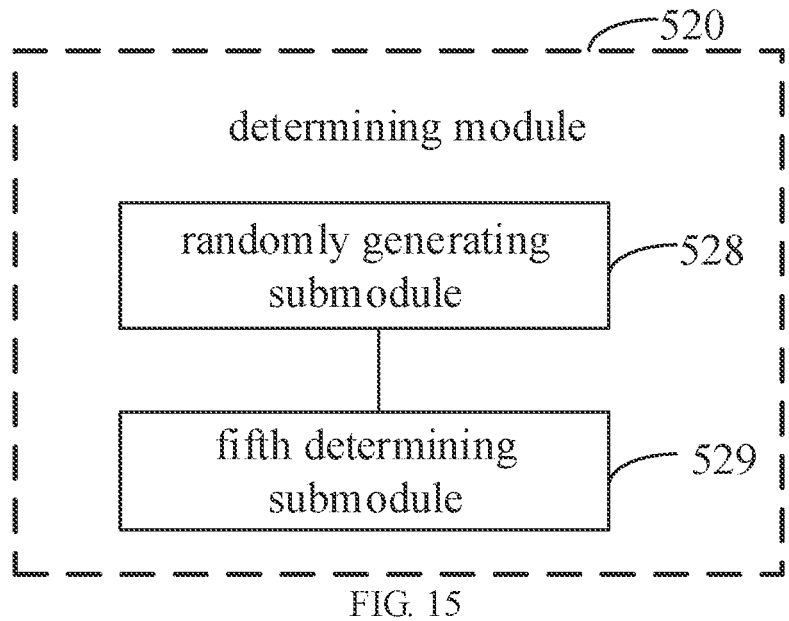
FIG. 15 is a block diagram illustrating an apparatus for establishing a unicast connection based on sidelink according to an exemplary embodiment.

FIG. 15 is a block diagram illustrating an apparatus for establishing a unicast connection based on sidelink according to an exemplary embodiment. The determining module 520 (FIG. 12) includes: a randomly generating submodule 528 and a fifth determining submodule 529.

The randomly generating submodule 528 is configured to generate the access probability parameter randomly, wherein the access probability parameter is configured to identify the success rate of accessing to the first terminal by the second terminal.

The fifth determining submodule 529 is configured to determine the second terminal is a target terminal when the value of the access probability parameter is less than the value of the target access probability parameter corresponding to the second terminal.

Figure 16:
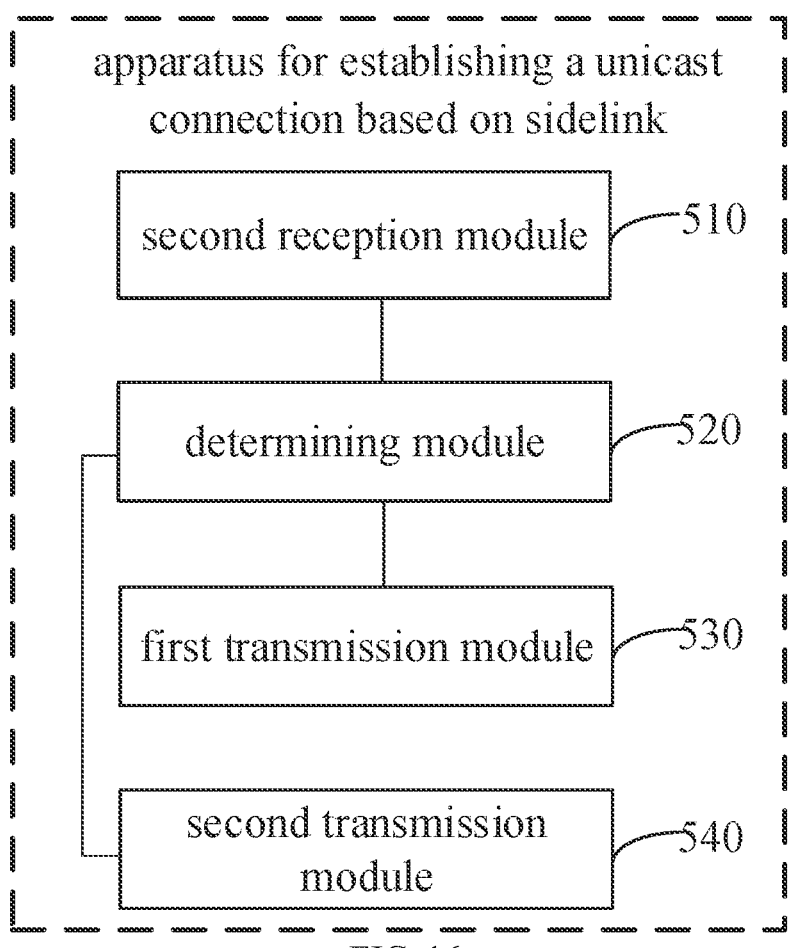
FIG. 16 is a block diagram illustrating an apparatus for establishing a unicast connection based on sidelink according to an exemplary embodiment.

FIG. 16 is a block diagram illustrating an apparatus for establishing a unicast connection based on sidelink according to an exemplary embodiment. The apparatus further includes: a second transmitting module 540.

The second transmitting module 540 is configured to transmit a connection establishment failure notification message to a non-access layer by an access layer when the second terminal is not a target terminal.

The apparatus embodiments basically correspond to the method embodiments, and reference may be made to the description of the method embodiments for related parts. The apparatus embodiments described above are merely exemplary, where the modules described as separate components may or may not be physically separated, and the components displayed as modules may be located in one place, or may be distributed to multiple networks. Some or all of the modules may be selected according to actual needs.

There is also provided a computer-readable storage medium having computer instructions stored thereon, in which the computer instructions are configured to cause a device to perform the above methods for establishing a unicast connection based on sidelink on a first terminal.

There is also provided a computer-readable storage medium having computer instructions stored thereon, in which the computer instructions are configured to cause a device to perform the above methods for establishing a unicast connection based on sidelink on a second terminal.

There is also provided an apparatus for establishing a unicast connection based on sidelink. The apparatus may be a first terminal and include: a processor; and a memory configured to store instructions executable by the processor.

The processor is configured to: broadcast an access control parameter: wherein the access control parameter is configured to determine whether a second terminal is a target terminal allowed to establish the unicast connection with the first terminal; receive a connection establishment request message transmitted by the second terminal in response to the second terminal being the target terminal; and establish the unicast connection with the second terminal based on the connection establishment request message.

There is also provided an apparatus for establishing a unicast connection based on sidelink. The apparatus may be a second terminal and include: a processor; and a memory configured to store instructions executable by the processor. The processor is configured to: receive an access control parameter broadcasted by a first terminal; determine whether the second terminal is a target terminal according to the access control parameter, wherein the target terminal is allowed to establish the unicast connection with the first terminal; and transmit a connection establishment request message to the first terminal in response to the second terminal being the target terminal, to allow the first terminal establishes the unicast connection with the second terminal based on the connection establishment request message.

Figure 17:
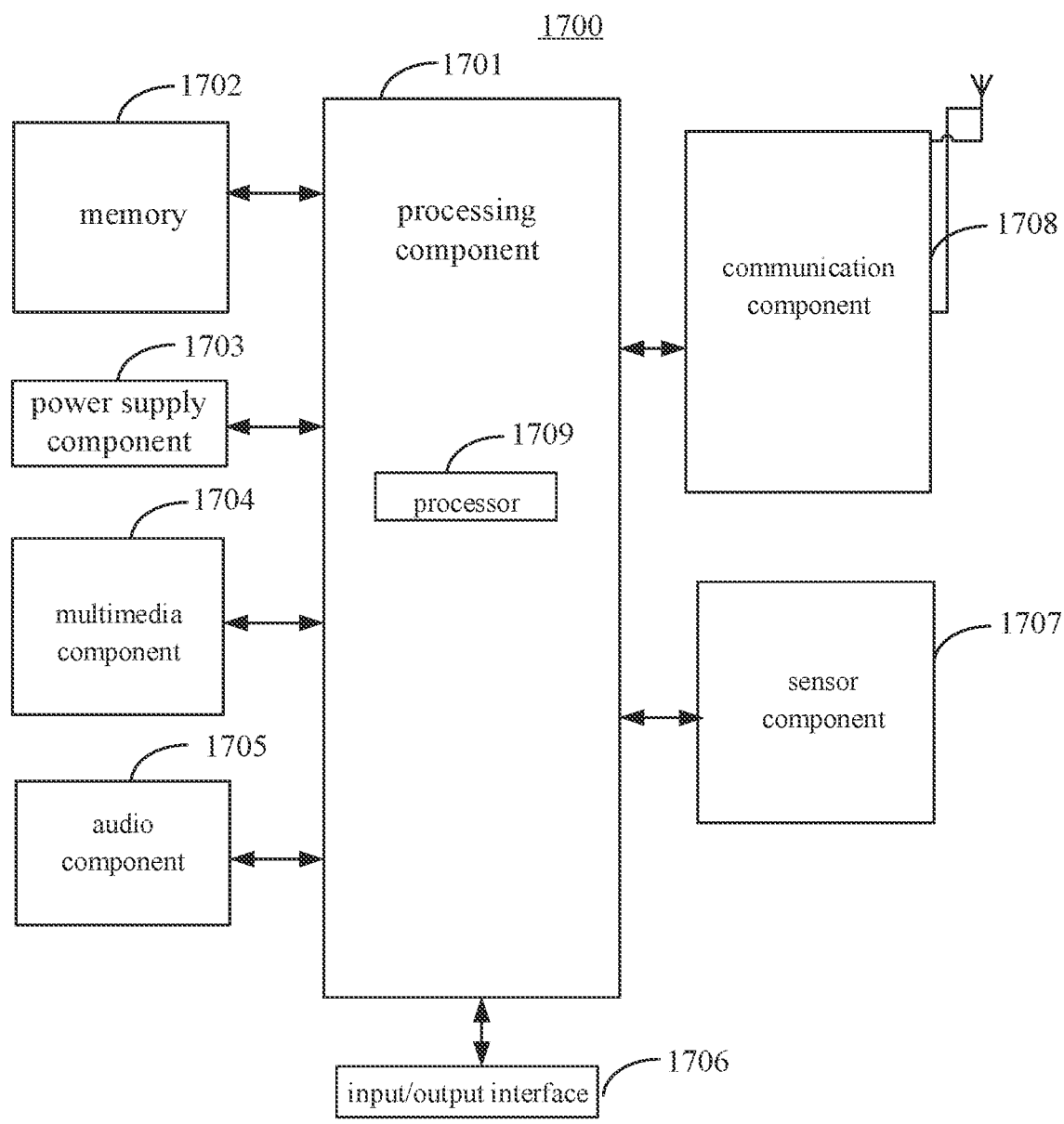
FIG. 17 is a schematic diagram illustrating an apparatus for establishing a unicast connection based on sidelink according to an exemplary embodiment.

FIG. 17 is a schematic diagram illustrating an apparatus 1700 for establishing a unicast connection based on sidelink according to an exemplary embodiment. The apparatus 1700 may be any of the first terminal or the second terminal described above. For example, the apparatus 1700 may be a computer, a mobile phone, a digital broadcasting terminal, a messaging device, a game console, a tablet device, a medical device, a fitness device, a personal digital assistant, and the like.

The apparatus 1700 may include one or more of the following components: a processing component 1701, a memory 1702, a power supply component 1703, a multimedia component 1704, an audio component 1705, an input/output (I/O) interface 1706, a sensor component 1707, and a communication component 1708.

The processing component 1701 typically controls overall operations of the control apparatus 1700, such as the operations associated with display, telephone calls, data communications, camera operations, and recording operations. The processing component 1701 may include one or more processors 1709 to execute instructions to perform all or part of the blocks in the above methods. Moreover, the processing component 1701 may include one or more modules which facilitate the interaction between the processing component 1701 and other components. For example, the processing component 1701 may include a multimedia module to facilitate the interaction between the multimedia component 1704 and the processing component 1701.

The memory 1702 is configured to store various types of data to support operations on the apparatus 1700. Examples of these data include instructions for any application or method operating on the apparatus 1700, such as contact data, phone book data, messages, pictures, videos, and so on. The memory 1702 can be implemented by any type of volatile or non-volatile storage device or their combination, such as a static random access memory (SRAM), an electrically erasable programmable read-only memory (EEPROM), an erasable and Programmable read only memory (EPROM), a programmable read only memory (PROM), a read only memory (ROM), a magnetic memory, a flash memory, a magnetic or optical disk.

The power supply component 1703 provides power for various components of the apparatus 1700. The power supply component 1703 may include a power management system, one or more power supplies, and other components associated with the generation, management, and distribution of power in the apparatus 1700.

The multimedia component 1704 includes a screen that provides an output interface between the apparatus 1700 and the user. In some embodiments, the screen may include a liquid crystal display (LCD) and a touch panel (TP). If the screen includes a touch panel, the screen may be used as a touch screen to receive input signals from the user. The touch panel includes one or more touch sensors to sense touch, slide, and gestures on the touch panel. The touch sensors may not only sense a boundary of a touch or swipe action, but also sense a period of time and a pressure associated with the touch or swipe action. In some embodiments, the multimedia component 1704 includes a front camera and/or a rear camera. The front camera and/or the rear camera may receive an external multimedia datum while the apparatus 1700 is in an operation mode, such as a photographing mode or a video mode. Each of the front camera and the rear camera may be a fixed optical lens system or have focus and optical zoom capability.

The audio component 1705 is configured to output and/or input audio signals. For example, the audio component 1705 includes a microphone (MIC). When the apparatus 1700 is in an operation mode, such as a call mode, a recording mode, and a voice recognition mode, the microphone is configured to receive external audio signals. The received audio signal may be further stored in the memory 1702 or transmitted via the communication component 1708. In some embodiments, the audio component 1705 further includes a speaker to output audio signals.

The I/O interface 1706 provides an interface between the processing component 1701 and the peripheral interface module. The peripheral interface module may be a keyboard, a click wheel, a button, and so on. These buttons may include but are not limited to: home button, volume button, start button, and lock button.

The sensor component 1707 includes one or more sensors to provide status assessments of various aspects of the apparatus 1700. For example, the sensor component 1707 may detect the on/off state of the apparatus 1700 and relative position of components, for example, components as the display and the keypad of the apparatus 1700. The sensor component 1707 may also detect changes of the position of the apparatus 1700 or one component of the apparatus 1700, and the presence or absence of contact between a user and the apparatus 1700, the position or acceleration/deceleration of the apparatus 1700, and the temperature change of the apparatus 1700. The sensor component 1707 may include a proximity sensor configured to detect the presence of nearby objects without any physical contact. The sensor component 1707 may also include a light sensor, such as a CMOS or CCD image sensor for the imaging applications. In some embodiments, the sensor component 1707 may also include an acceleration sensor, a gyroscope sensor, a magnetic sensor, a pressure sensor or a temperature sensor.

The communication component 1708 is configured to facilitate communication, wired or wirelessly, between the apparatus 1700 and other devices. The apparatus 1700 may get access to a wireless network based on the communication standard, such as WiFi, 4G or 5G, or their combinations. In one exemplary embodiment, the communication component 1708 receives a broadcast signal or broadcast associated information from an external broadcast management system via a broadcast channel. In one exemplary embodiment, the communication component 1708 further includes a near field communication (NFC) module to facilitate short-range communications. In one exemplary embodiment, the communication component 1708 may be implemented based on a radio frequency identification (RFID) technology, an infrared data association (IrDA) technology, an ultra-wideband (UWB) technology, a Bluetooth (BT) technology, and other technologies.

In an exemplary embodiment, the apparatus 1700 may be implemented by one or more application specific integrated circuits (ASIC), digital signal processors (DSP), digital signal processing devices (DSPD), programmable logic devices (PLD), field-programmable gate array (FPGA), controller, micro-controller, microprocessor, or other electronic components, for performing the above methods.

In exemplary embodiments, there is also provided a non-transitory computer-readable storage medium including instructions, such as included in the memory 1702, executable by the processor 1709 in the apparatus 1700, for performing the above methods. For example, the non-transitory computer-readable storage medium may be a ROM, a RAM, a CD-ROM, a magnetic tape, a floppy disc, an optical data storage device, and the like. When the instructions in the storage medium are executed by the processor, the apparatus 1700 can execute any one of the methods.

Other implementations of the present disclosure will be apparent to those skilled in the art from consideration of the specification and practice of the present disclosure herein. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the disclosure being indicated by the following claims.

It is to be understood that the present disclosure is not limited to the precise structure described above and shown in the drawings, and various modifications and changes can be made without departing from its scope. The scope of the present disclosure is only limited by the appended claims.

What is claimed is:

1. A method for establishing a unicast connection based on sidelink, the method being performed by a first terminal and comprising:
   broadcasting an access control parameter, wherein the access control parameter is configured for a second terminal to determine whether the second terminal is a target terminal allowed to establish the unicast connection with the first terminal;
   receiving a connection establishment request message transmitted by the second terminal in response to the second terminal being the target terminal; and
   establishing the unicast connection with the second terminal based on the connection establishment request message,
   wherein the access control parameter comprises at least one of:
   a maximum distance value between the target terminal and the first terminal;
   a target area identification of a target area where the target terminal is located; or
   a target access probability parameter corresponding to at least one of a target identification parameter and the target area identification;
   wherein the target identification parameter comprises at least one of a target service type identification parameter configured to identify a current service type of the target terminal and a target terminal type identification parameter configured to identify a target terminal type, and the target access probability parameter is configured to identify a success rate of successfully establishing the unicast connection between the target terminal and the first terminal.

2. A non-transitory computer-readable storage medium having stored thereon instructions that, when executed by a processor of a device, cause the device to perform the method for establishing a unicast connection based on sidelink according to claim 1.

3. A first terminal, comprising:
   a processor; and
   a memory configured to store instructions executable by the processor;
   wherein the processor is configured to perform the method for establishing a unicast connection based on sidelink according to claim 1.

4. A method for establishing a unicast connection based on sidelink, the method being performed by a second terminal and comprising:
   receiving an access control parameter broadcasted by a first terminal;
   determining, according to the access control parameter, whether the second terminal is a target terminal allowed to establish the unicast connection with the first terminal; and
   transmitting a connection establishment request message to the first terminal in response to the second terminal being the target terminal, to allow the first terminal to establish the unicast connection with the second terminal based on the connection establishment request message,
   wherein the access control parameter comprises at least one of:
   a maximum distance value between the target terminal and the first terminal;
   a target area identification of a target area where the target terminal is located; or
   a target access probability parameter corresponding to at least one of a target identification parameter and the target area identification;
   wherein the target identification parameter comprises at least one of a target service type identification parameter configured to identify a current service type of the target terminal and a target terminal type identification parameter configured to identify a target terminal type, and the target access probability parameter is configured to identify a success rate of successfully establishing the unicast connection between the target terminal and the first terminal.

5. The method of claim 4, wherein the access control parameter comprises the maximum distance value, and determining whether the second terminal is a target terminal according to the access control parameter comprises:
   acquiring information of a first geographic location where the first terminal is located, the information being broadcasted by the first terminal;
   determining information of a second geographic location where the second terminal is located;
   calculating an actual distance value between the second terminal and the first terminal according to the information of the first geographic location and the information of the second geographic location; and
   determining the second terminal being the target terminal when the actual distance value is less than or equal to the maximum distance value.

6. The method of claim 4, wherein the access control parameter comprises the target area identification, and determining whether the second terminal is a target terminal according to the access control parameter comprises:
  determining information of a second geographic location where the second terminal is located;
  calculating a current area identification corresponding to the second terminal according to the second geographic location information; and
  determining the second terminal being the target terminal when the target area identification comprises the current area identification.

7. The method of claim 4, wherein the access control parameter comprises the target access probability parameter, and determining whether the second terminal is a target terminal according to the access control parameter comprises:
  generating the access probability parameter randomly, wherein the access probability parameter is configured to identify a success rate of accessing the first terminal by the second terminal; and
  determining the second terminal being the target terminal when a value of the generated access probability parameter is less than a value of the target access probability parameter corresponding to the second terminal.

8. The method of claim 4, further comprising:
  transmitting a connection establishment failure notification message to a non-access layer by an access layer when the second terminal is not a target terminal.

9. A non-transitory computer-readable storage medium having stored thereon instructions that, when executed by a processor of a device, cause the device to perform the method for establishing a unicast connection based on sidelink according to claim 4.

10. A second terminal, comprising:
  a processor; and
  a memory configured to store instructions executable by the processor;
  wherein the processor is configured to:
  receive an access control parameter broadcasted by a first terminal;
  determine, according to the access control parameter, whether the second terminal is a target terminal allowed to establish a unicast connection with the first terminal; and
  transmit a connection establishment request message to the first terminal in response to the second terminal being the target terminal, to allow the first terminal to establish the unicast connection with the second terminal based on the connection establishment request message,
  wherein the access control parameter comprises at least one of:
  a maximum distance value between the target terminal and the first terminal;
  a target area identification of a target area where the target terminal is located; or
  a target access probability parameter corresponding to at least one of a target identification parameter and the target area identification;
  wherein the target identification parameter comprises at least one of a target service type identification parameter configured to identify a current service type of the target terminal and a target terminal type identification parameter configured to identify a target terminal type, and the target access probability parameter is configured to identify a success rate of successfully establishing the unicast connection between the target terminal and the first terminal.

11. The second terminal of claim 10, wherein the processor is further configured to:
  acquire information of a first geographic location where the first terminal is located, the information being broadcasted by the first terminal;
  determine information of a second geographic location where the second terminal is located;
  calculate an actual distance value between the second terminal and the first terminal according to the information of the first geographic location and the information of the second geographic location; and
  determine the second terminal being the target terminal when the actual distance value is less than or equal to the maximum distance value.

12. The second terminal of claim 10, wherein the processor is further configured to:
  determine information of a second geographic location where the second terminal is located;
  calculate a current area identification corresponding to the second terminal according to the second geographic location information; and
  determine the second terminal being the target terminal when the target area identification comprises the current area identification.

13. The second terminal of claim 10, wherein the processor is further configured to:
  generate the access probability parameter randomly, wherein the access probability parameter is configured to identify a success rate of accessing the first terminal by the second terminal; and
  determine the second terminal being the target terminal when a value of the generated access probability parameter is less than a value of the target access probability parameter corresponding to the second terminal.

14. The second terminal of claim 10, wherein the processor is further configured to:
  transmit a connection establishment failure notification message to a non-access layer by an access layer when the second terminal is not a target terminal.

* * * * *